United States Patent [19]
Cheng et al.

[11] Patent Number: 6,130,801
[45] Date of Patent: Oct. 10, 2000

[54] COMPOSITE DISC SPACER FOR A DISC DRIVE

[75] Inventors: Chunjer C. Cheng, Saratoga; Keith F. Wood, Sunnyvale, both of Calif.

[73] Assignee: Seagate Technology, Inc., Scotts Valley, Calif.

[21] Appl. No.: 09/187,775

[22] Filed: Nov. 6, 1998

Related U.S. Application Data

[60] Provisional application No. 60/064,819, Nov. 7, 1997.

[51] Int. Cl.[7] .................................................. G11B 17/02
[52] U.S. Cl. ...................................................... 360/98.08
[58] Field of Search ............................. 360/98.07, 98.08, 360/99.05, 99.12; 369/270, 271

[56] References Cited

U.S. PATENT DOCUMENTS

| | | | |
|---|---|---|---|
| 5,243,481 | 9/1993 | Dunckley et al. | 360/99.08 |
| 5,267,106 | 11/1993 | Brue et al. | 360/98.08 |
| 5,315,463 | 5/1994 | Dew et al. | 360/98.08 |
| 5,367,418 | 11/1994 | Chessman et al. | 360/99.12 |
| 5,422,768 | 6/1995 | Roehling et al. | 360/98.08 |
| 5,493,462 | 2/1996 | Peter | 360/99.12 |
| 5,550,690 | 8/1996 | Boutaghou et al. | 360/99.12 |
| 5,592,349 | 1/1997 | Morehouse et al. | 360/98.08 |
| 5,615,067 | 3/1997 | Jabbari et al. | 360/98.08 |
| 5,659,443 | 8/1997 | Berberich | 360/98.06 |
| 5,694,269 | 12/1997 | Lee | 360/98.08 |
| 5,781,375 | 7/1998 | Moir et al. | 360/98.08 |
| 5,862,120 | 1/1999 | Mukawa | 369/270 |
| 5,872,681 | 2/1999 | Boutaghou | 360/99.12 |
| 5,880,905 | 3/1999 | Kazmierczak et al. | 360/98.08 |
| 5,917,677 | 6/1999 | Moir et al. | 360/99.12 |
| 5,923,498 | 7/1999 | Moir et al. | 360/98.08 |
| 5,940,244 | 8/1999 | Canlas et al. | 360/98.08 |

*Primary Examiner*—Jefferson Evans
*Attorney, Agent, or Firm*—Crowe & Dunlevy

[57] ABSTRACT

A disc mounting system for mounting the discs of a disc drive in a fixed radial relationship to the hub of a spindle motor, the disc mounting system including a composite disc spacer that maintains the discs in a fixed radial relationship to the spindle motor hub. The composite disc spacer includes a wedge member which supports a plurality of axially extending fingers which include inwardly and outwardly facing surfaces that bear against the spindle motor hub and against the bores of the discs to maintain the discs in a fixed concentric relationship to the spindle motor hub. The composite also has a spacer that extends about the wedge member to provide fixed relative axial spacing of the discs. The wedge member and the spacer interlock to facilitate handling of the composite disc spacer during assembly.

15 Claims, 5 Drawing Sheets

COMPOSITE DISC SPACER FOR A DISC DRIVE

RELATED APPLICATIONS

This application claims the benefit of U.S. Provisional Application No. 60/064,819 entitled COMPOSITE DISC SPACER, filed Nov. 7, 1997.

FIELD OF THE INVENTION

This invention relates generally to the field of hard disc drive data storage devices, or disc drives, and more particularly but not by way of limitation, to a novel disc spacer arrangement that prevents radial displacement of the discs relative to the hub of a spindle motor on which the discs are mounted.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless direct current spindle motor. In disc drives of the current generation, the spindle motor rotates the discs at speeds of up to 10,000 revolutions per minute.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly each read/write head assembly in a closely spaced relationship to the disc surface. In order to maintain the proper flying relationship between the read/write head assemblies and the discs, the read/write head assemblies are attached to and supported by head suspensions or flexures.

The actuator assembly used to move the read/write heads from track to track has assumed many forms historically, with most disc drives of the current generation incorporating an actuator of the type referred to as a rotary voice coil actuator. A typical rotary voice coil actuator consists of a pivot shaft fixedly attached to a disc drive housing base member at a location closely adjacent an outer edge of the discs. The pivot shaft is mounted such that its central axis is normal to the plane of rotation of the discs. An actuator bearing housing is mounted to the pivot shaft by an arrangement of precision ball bearing assemblies, and supports, in turn, a flat coil which is suspended in a magnetic field of an array of permanent magnets which are fixedly mounted to the disc drive housing base member.

On the side of the actuator bearing housing opposite to the coil, the actuator bearing housing also typically includes a plurality of vertically aligned, radially extending actuator head mounting arms to which the head suspensions mentioned above are mounted. When controlled direct current is applied to the coil, a magnetic field is formed surrounding the coil which interacts with the magnetic field of the permanent magnets to rotate the actuator bearing housing, with the attached head suspensions and read/write head assemblies, in accordance with the well-known Lorentz relationship. As the actuator bearing housing rotates, the read/write heads are moved radially across the data tracks along an arcuate path.

Disc drives of the current generation are included in desk-top computer systems for office and home environments, as well as in laptop computers which, because of inherent portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large magnitudes of mechanical shock as a result of handling. It is common in the industry, therefore, that disc drives be specified to operate over ambient temperature ranges of from, for instance, minus 5 to 60 degrees Celsius, and further that drives be specified to be capable of withstanding operating mechanical shocks of 100 G or greater without becoming inoperable.

One of the areas of disc drive design which is of particular concern when considering ambient temperature variations and mechanical shock resistance is the system used to mount the discs to the spindle motor. During manufacture the discs are mounted to the spindle motor in a temperature and cleanliness controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is essential that the servo information, and all data subsequently recorded, spin in a concentric relation to the spin axis of the spindle motor. The discs, therefore, must be mounted to the spindle motor in a manner that prevents shifting of the discs relative to the spindle motor when subjected to a mechanical shock.

Several systems for clamping the discs to the spindle motor have been described in patents, including U.S. Pat. No. 5,528,434, issued to Bronshvatch et al. on Jun. 18, 1996; U.S. Pat. No. 5,517,376, issued to Green on May 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994, all assigned to the assignee of the present invention. In each of these disc clamping systems the spindle motor includes a disc mounting flange that extends radially from a lower end of the spindle motor hub. A first disc is placed over the hub during assembly and brought to rest on this disc mounting flange. An arrangement of disc spacers and additional discs are then alternately placed over the hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange.

From the above description, it would appear that the only element that would need to be considered when designing a disc clamping system would be the disc clamp, with any requirement for additional clamping force being met by an increase in the strength of the disc clamp. However, with an industry trend toward size reduction in the overall disc drive, the size of various components within the disc drive has necessarily been reduced, including the thickness of the discs. As the discs have become thinner, the amount of clamping force that can be applied to the discs without causing mechanical distortion of the discs is limited. That is, variation in the flatness of the disc mounting flange, the discs, and the disc spacers contribute to flatness concerns of the discs relative to the read/write heads. The yield strength of the disc material, too, affects the flatness of the joined assembly providing the disc pack. All these factors, as well as others known to persons skilled in the art, limit the axial clamping force that can be applied.

Furthermore, the demand for greater non-operating mechanical shock resistance is continuously driving the market, with future disc drive products being contemplated as being capable of operating after experiencing non-operating mechanical shocks in the range of 1000 G.

In light of these facts, it is clear that the currently common practice of axially loading the disc stack to prevent shifting of the discs relative to the spindle motor hub is not capable of meeting current and future requirements, and a new system for mounting the discs to the spindle motor hub is clearly needed.

SUMMARY OF THE INVENTION

The present invention provides a disc mounting system for mounting the discs of a disc drive in a fixed radial relationship to the hub of a spindle motor. Tile disc mounting system includes a novel composite disc spacer that includes features for maintaining the discs in a fixed radial relationship to the hub of the spindle motor. The composite disc spacer includes a wedge member, formed of a plastic or other compliant material. The wedge member supports a plurality of axially extending fingers which include wedge surfaces which bear against the bevels on the inner radial edges of the discs, and cause the discs to be maintained in a fixed concentric relationship to the hub of the spindle motor. A metallic spacer is also included in the composite disc spacer to provide fixed relative axial spacing of the discs. Features to interlock the wedge member to the spacer and facilitate handling of the paired components as a unit are also disclosed.

The manner in which the present invention is implemented, as well as other features, benefits and advantages of the invention, will be clear from the following detailed description of the invention when read in conjunction with the accompanying drawings and appended claims.

DETAILED DESCRIPTION OF THE INVENTION

Figure 1:
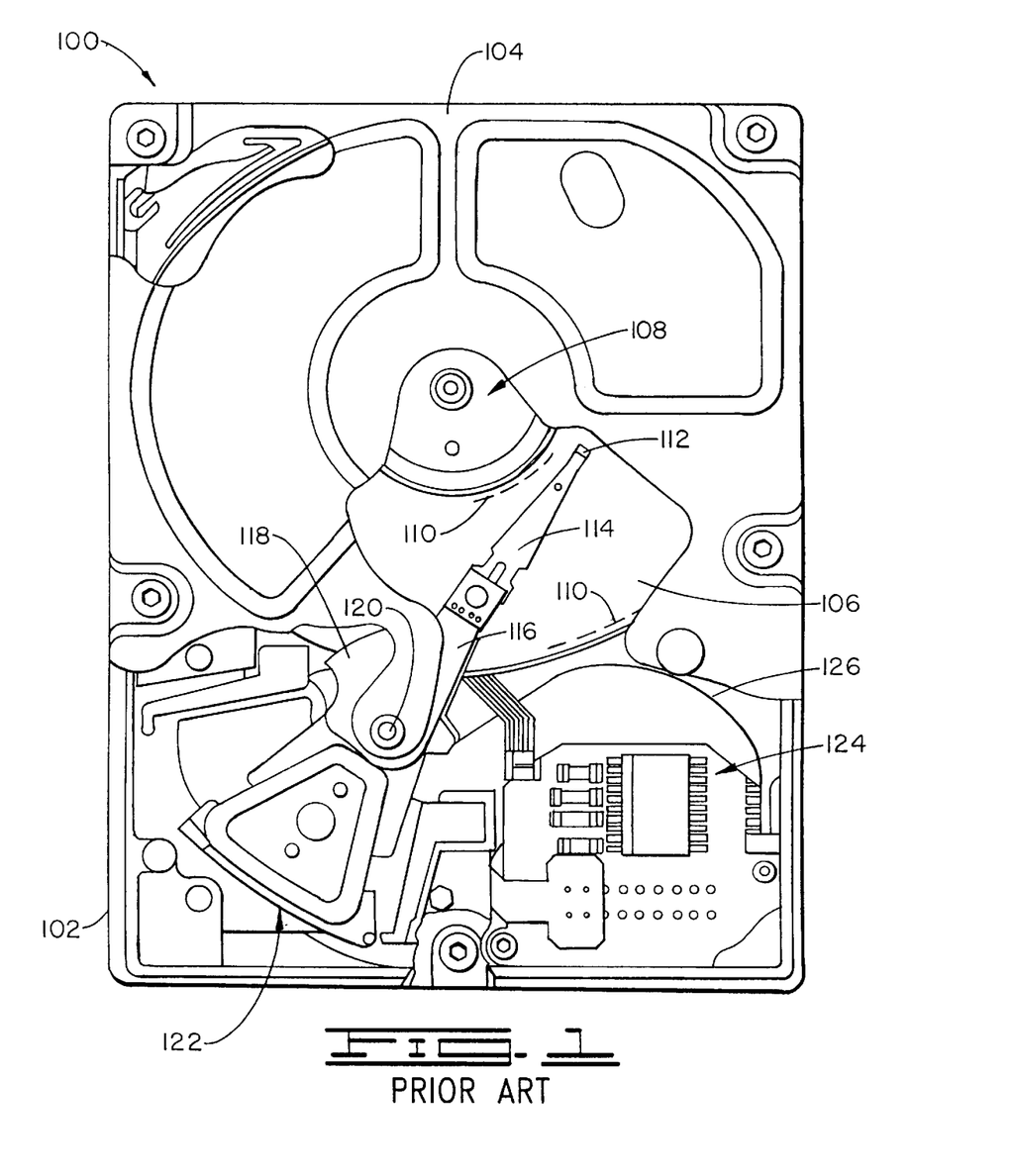
FIG. 1 is a plan view, in partial cutaway, of a prior art disc drive in which the present invention is particularly useful.

Turning now to the drawings and specifically to FIG. 1, shown therein is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive 100 includes a plurality of discs 106 which are mounted for rotation on a spindle motor shown generally at 108. The surfaces of the discs 106 include a plurality of circular, concentric data tracks 110, the innermost and outermost of which are depicted by dashed lines, on which data are recorded via an array of vertically aligned head assemblies 112 (one of which is shown). The head assemblies 112 are supported by head suspensions, or flexures 114, which are attached to actuator head mounting arms 116 (one of which is shown). The actuator head mounting arms 116 can be integral to an actuator bearing housing 118 which is mounted via an array of ball bearing assemblies (not designated) for rotation about a pivot shaft 120.

Power to drive the actuator bearing housing 118 in rotation about the pivot shaft 120 is provided by a voice coil motor (VCM) 122 shown generally. The VCM 122 consists of a coil (not separately designated) which is supported by the actuator bearing housing 118 within the magnetic field of an array of permanent magnets (also not separately designated) which are fixedly mounted to the base member 102 all in a manner known in the industry. Electronic circuitry 124 partially shown generally, and partially carried on a printed circuit board (not shown) to control all aspects of the operation of the disc drive 100 is provided, with control signals to drive the VCM 122, as well as data signals to and from the heads 112, carried between the electronic circuitry and the moving actuator assembly via a flexible printed circuit cable (PCC) 126.

Figure 2:
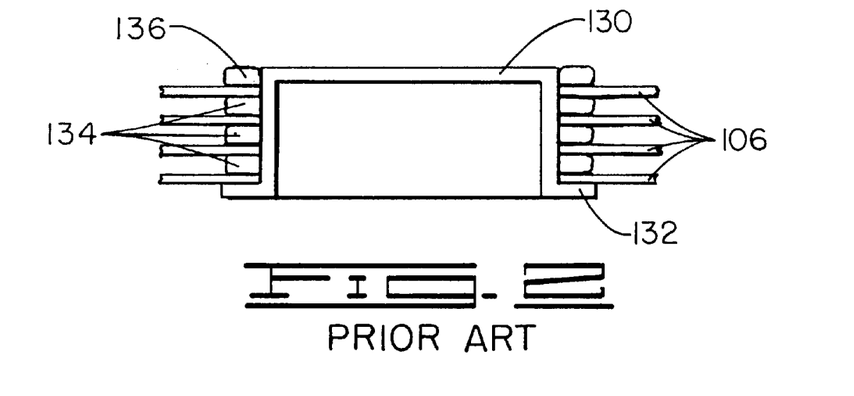
FIG. 2 is a semi-detailed sectional elevation view of a first prior art system for mounting discs to a spindle motor hub in a disc drive.

FIG. 2 is a semi-detailed sectional elevation view of a typical prior art disc mounting system which utilizes axial loading to secure the discs 106. It will be noted that a hub 130 of the spindle motor 108 has a radially extending disc mounting flange 132. The hub 130 is substantially cup-shaped being closed at the upper end and open at the lower end. A person skilled in the art will appreciate that the electrical and magnetic components (not shown) that rotate the hub 130 are typically located within the hub.

FIG. 2 also shows a plurality of discs 106 (in part) and disc spacers 134. The disc stack is assembled by placing a first one of the discs 106 over the hub 130 to rest against the disc mounting flange 32. The stack is formed by then alternately placing disc spacers 134 and discs 106 over the hub until the intended number of discs 106 have been positioned. A disc clamp 136 is then assembled to the upper end of the hub 130 to complete the assembly. While an example disc stack which includes four discs 106 is shown, it will be appreciated that the scope of the present invention includes disc stacks having both greater and lesser numbers of discs.

In FIG. 2, the disc clamp 136 is of the type referred to in the industry as a "shrink-fit" clamp. Such clamps have an inner diameter that is nominally smaller than the outer diameter of the hub 130. Assembly is accomplished by heating the clamp 136 so that thermal expansion permits the clamp 136 to pass over the hub 130. The desired magnitude of axial loading is then applied to the disc clamp 136 and the clamp 136 is allowed to cool and shrink fit with the hub 130.

Figure 3:
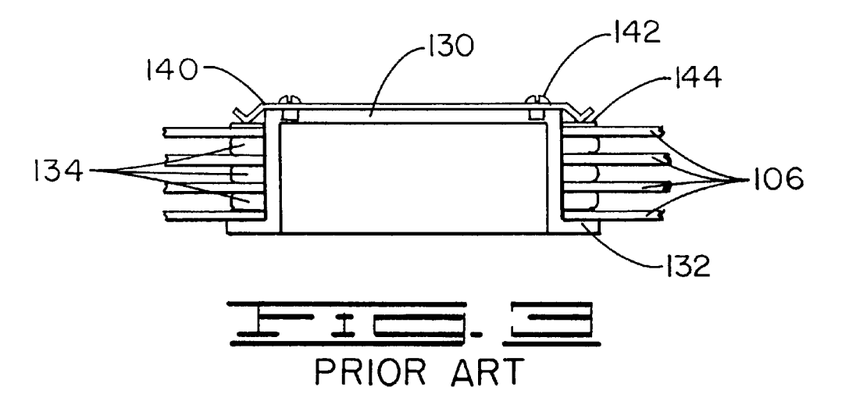
FIG. 3 is a semi-detailed sectional elevation view of a second prior art system for mounting discs to a spindle motor hub in a disc drive.

Turning now to FIG. 3, shown therein is a semi-detailed sectional elevation view, similar to that of FIG. 2, showing a second prior art disc clamping system. FIG. 3 shows the spindle motor hub 130 with the disc mounting flange 132 as discussed with reference to FIG. 2, and the stack of discs 106 (shown in part) and disc spacers 134, as shown in FIG. 2.

In FIG. 3 there is shown a disc clamp 140 of the type known in the industry as a "spring clamp." The disc clamp 140 is typically formed from spring steel having the desired spring characteristics and includes circumferential corrugations closely adjacent the outer diameter of the disc clamp 140 which form a contact surface (not designated) for exerting force to the disc stack when a plurality of screws 142 are assembled through the disc clamp 140 into threaded holes in the hub 130. It is also typical for disc clamping systems incorporating disc clamps 140 to include a washer member 144 between the contact surface of the disc clamp 140 and the surface of the uppermost disc 106. The washer member 144 aids in evenly distributing the clamping force of the disc clamp 140 about the circumference of the discs 106 and allows for slip contact between the contact surface of the disc clamp 140 and the washer member 144 when the screws 142 are tightened thus preventing the exertion of radial stresses directly to the uppermost disc 106.

Selection of the material and geometry of the disc clamp 140 will determine the amount of axial clamping force exerted by the disc clamping system depicted in FIG. 3, as will be appreciated by persons skilled in the art. Details of typical disc clamping systems incorporating a spring disc clamp such as that depicted in FIG. 3 can be found in previously mentioned U.S. Pat. Nos. 5,274,517 and 5,295.030.

Both of the prior art disc clamping systems of FIGS. 2 and 3 share a common drawback. Specifically, since the bore diameter of the discs must be at least slightly larger than the diameter of the spindle motor hub 130, the discs 106 are subject to radial displacement relative to the spindle motor hub 130. Such displacement can be due to differential thermal expansion, or due to applied mechanical shocks. Because the clamping forces applied to the disc stack are in the axial direction, the resistance to radial shifting of the discs relative to the spindle motor hub 130 depends on the frictional engagement of adjacent discs 106 and disc spacers 134. With the increasing, demand that disc drives withstand higher and higher mechanical shocks, conventional axially loaded disc mounting systems are proving to be inadequate to meet more demanding operating specifications.

Figure 4:
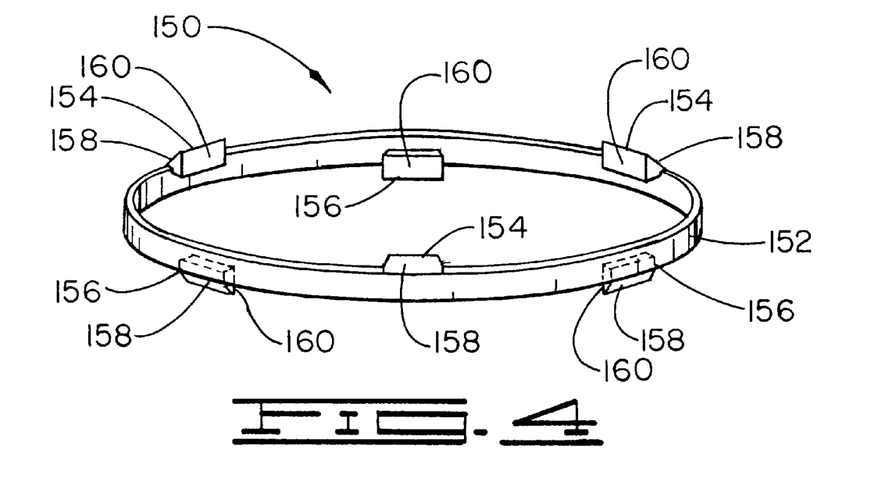
FIG. 4 is a perspective view of a wedge member which forms a portion of the present invention.

FIG. 4 is a perspective view of a wedge member 150 which forms a portion of the disc spacer arrangement of the present invention. The wedge member 150 is preferably fabricated from a plastic, such as Ultem® (a product of General Electric Plastics), polycarbonate or other suitable materials having the compliance to meet the functional requirements to be described below. As will be appreciated by those skilled in the art, the material selected for the fabrication of the wedge member 150 must be a non-out gassing and non-particulate producing material suitable for use within the clean environment of the sealed disc drive housing.

The wedge member 150 comprises a ring portion 152 which is configured to interact with a second element of the invention to be described below. The ring portion 152 supports, on the inner surface thereof, a plurality of upwardly-extending fingers 154 and downwardly-extending fingers 156. FIG. 4 shows three each of the fingers 154, 156, which is the preferred configuration. Thus, the upwardly-extending fingers 154 are spaced equally about the circumference of the ring portion 152 at 120 degrees apart. The downwardly-extending fingers 156 are similarly spaced, with the positions of the downward-extending fingers 156 disposed between the positions of the upwardly-extending fingers 154. This arrangement of three each of the fingers 154, 156 provides a self-centering aspect of the invention, but the scope of the present invention is envisioned to encompass greater or lesser numbers of the fingers 154, 156.

As shown in FIG. 4, each of the upwardly-extending fingers 154 and the downwardly-extending fingers 156 has an outwardly-facing wedge surface 158. The wedge surfaces 158 are determined to interrelate with the inner diameters of the discs 106 of FIG. 1 in a manner to be described below. Each of the fingers 154, 156 also has an inwardly-facing hub contact surface 160 which, as will be shown below, interacts with the spindle motor hub 130 in the final assembled mode.

Figure 5:
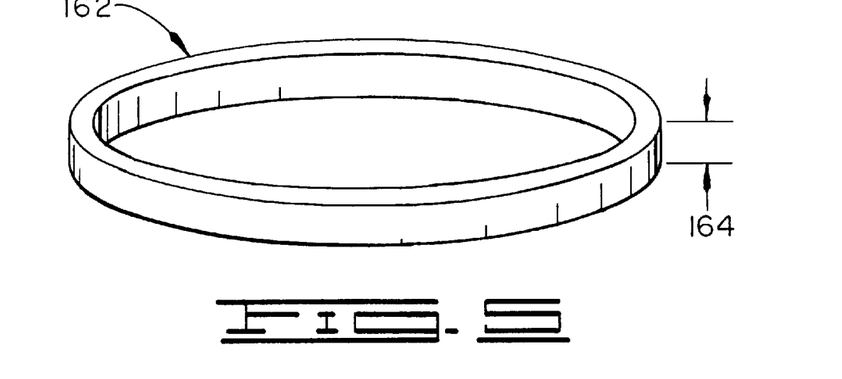
FIG. 5 is a perspective view of a disc spacer which forms a portion of the present invention.

FIG. 5 is a perspective view of a spacer 162 which forms the second portion of the spacer arrangement of the present invention. The spacer 162 is an annular member having a bore diameter selected to interact with the wedge member 150 of FIG. 4, and the spacer 162 has a depth or height 164 selected to provide the desired inter-disc spacing within the disc drive assembly. In the preferred embodiment, the spacer 162 is formed of aluminum, stainless steel or other suitable metal to establish a fixed spacing between adjacent discs in the disc stack.

Figure 6:
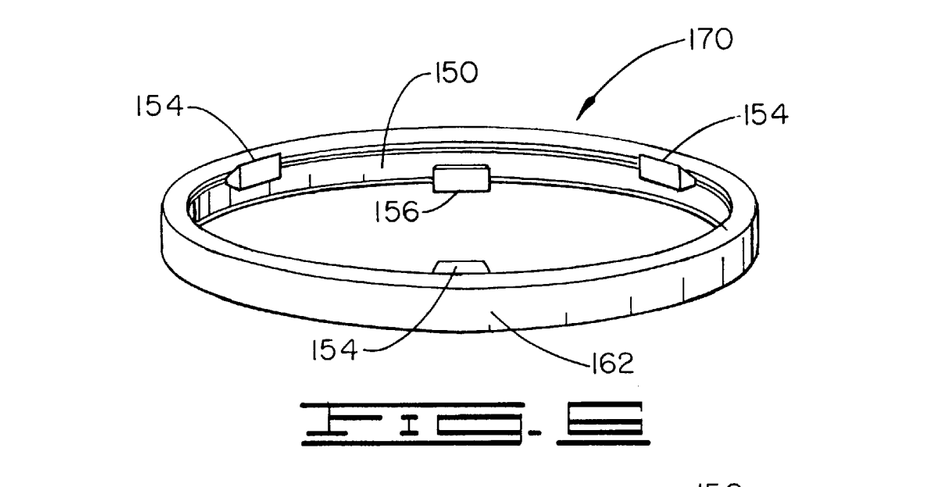
FIG. 6 is a perspective view showing the wedge member of FIG. 4 and the disc spacer of FIG. 5 in the assembled mode thereof.

FIG. 6 is a perspective view of the wedge member 150 of FIG. 4 and the spacer 162 of FIG. 5 in the assembled mode thereof to form a composite disc spacer 170. The dimensions of the wedge member 150 and the spacer 162 are established such that the wedge member 150 fits snugly within the bore of the spacer 162. As will be discussed in more detail hereinbelow, a presently preferred embodiment of the invention envisions that the wedge member 150 and spacer 162 include features that mechanically join the two components, so that these parts can be handled as a unit during the assembly of a disc stack.

FIG. 6 also shows that when the wedge member 150 and the spacer 162 are assembled together to form the composite disc spacer 170, the upwardly-extending fingers 154 of the wedge member 150 extend above the uppermost surface of the spacer 162, and the downwardly-extending fingers 156 extend below the lowermost surface of the spacer 162. The reasons for these relationships will become clear in the discussion below of a disc stack incorporating the composite disc spacer 170 of the invention.

Figure 7:
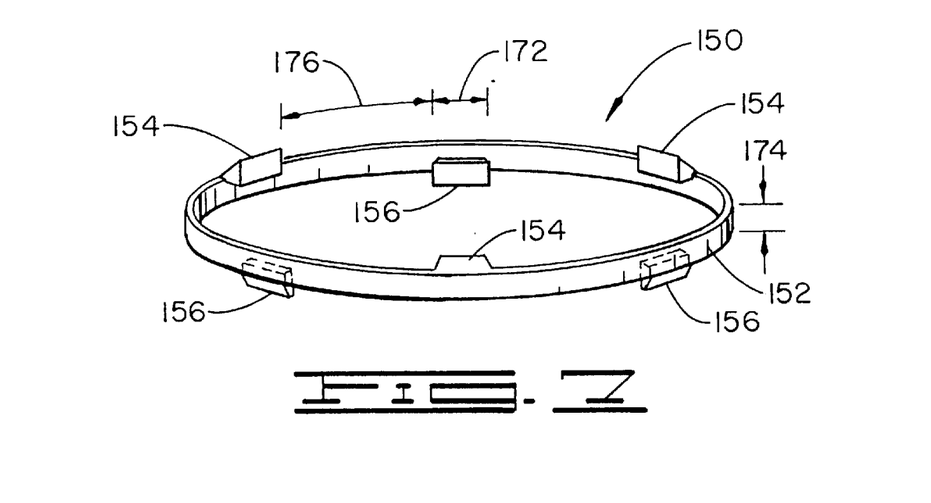
FIG. 7 is a perspective view of the wedge member of FIG. 4, showing various geometrical dimensions which influence certain mechanical characteristics of the wedge member.

FIG. 7 is a perspective view of the wedge member 150 identifying certain physical dimensions thereof that determine its functionality. Specifically, the wedge member 150 is fabricated to have certain spring characteristics to ensure positive contact between the discs 106 of the disc stack and the spindle motor hub 130 on which the disc stack is mounted. In FIG. 7, the wedge member 150 is shown to have the following dimensions: each of the fingers 154 and 156 has a width 172: the ring portion 152 has a depth or height 174; and a span 176 measured between each of the adjacent upwardly-extending finger members 154 and downwardly-extending finger members 156. The spring rate, $K_f$, can be estimated by the equation:

$$K_t = E \cdot w \cdot \frac{d^3}{s^3}$$

where $K_t$=the spring rate;

E=the Young's modulus of the material of the wedge member;

w=the width 172 of the fingers 154, 156;

d=the depth or height 174 of the ring portion 152; and s=the span 176 between adjacent fingers 154, 156.

Thus, by selection of the material of fabrication of the wedge member 150 and by selectively determining the noted dimensions, the spring characteristics of the wedge member 150 can be optimized to the particular needs of a specified disc drive 100.

Figure 8:
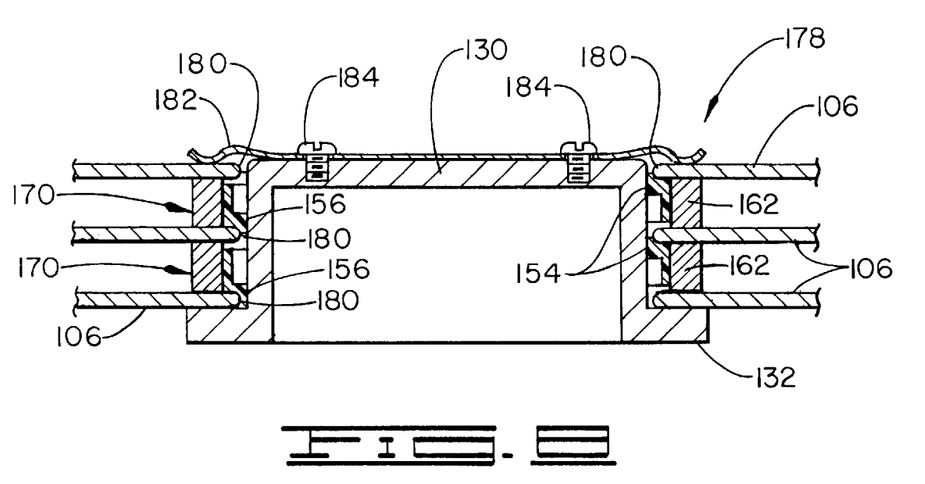
FIG. 8 is a semi-detailed sectional elevation view of a disc drive constructed in accordance with the present invention.

FIG. 8 is a semi-detailed sectional elevation view of a disc stack 178 for a disc drive 100 and includes the composite disc spacer 170 of the present invention. The disc stack 178 is formed on the spindle motor hub 130 having the radially extending disc mounting flange 132, similar to the hubs 130 shown in the prior art disc mounting systems of FIGS. 2 and 3. As is common in the industry, the discs 106 in the disc stack 178 are shown as having chamfers 180 at the inner bore.

The disc stack 178 is formed in a manner described in the following. The first one of the discs 106 is placed over the spindle motor hub 130 and supported on the disc mounting flange 132 A first one of the composite disc spacers 170 (consisting of the wedge member 150 and the spacer 162) is placed over the spindle motor hub 130 and brought into contact with the previously mounted disc 106 with the downwardly-extending fingers 156 of the wedge member 150 engaging the chamfer 180 on the inner bore edge of the disc 106, and the lower surface of the disc spacer 162 adjacent the upper surface of the disc 106.

A second one of the discs 106 is placed over the spindle motor hub 130 with the chamfer 180 on the bore edge of the secondly assembled disc 106 engaging the upwardly-extending fingers 154 of the wedge member 150 below, and the lower surface of the secondly assembled disc 106 adjacent the upper surface of the spacer 162 below.

Additional composite disc spacers 170 and discs 106 are added until the desired disc stack is completed. An axial force is applied to a disc clamp 182, similar to the previously described disc clamp 140 (shown in FIG. 3), which is secured to the top of the spindle motor hub 130 such as by a plurality of screws 184. The axial force drives the fingers 154, 156 into pressing engagement against the bore edge of each disc 106, and the spacers 162 into pressing engagement against the adjacent discs 106 to lockingly retain the discs 106.

While three discs 106 are depicted in FIG. 8 as being separated and supported by two composite spacers 170, it will be appreciated that the present invention is readily usable in disc stacks containing more or fewer discs. One will also realize that various types of disc clamps, including a specially modified disc clamp including downwardly-extending fingers similar to the fingers 156 of the composite disc spacer 170 can be utilized within the scope of the present invention.

When it is recalled that the wedge member 150 preferably includes three upwardly-extending fingers 154 and three downwardly-extending fingers 156, it will be evident that the composite disc spacer 170 acts to positively center the discs 106 relative to the spindle motor hub 130. That is, the hub contact surfaces 160 of the fingers 154 and 156 (shown in FIG. 4) will bear against the spindle motor hub 130, while the wedge surfaces 158 of the fingers 154 and 156 will be in firm contact with the chamfers 180 on the inner bore edges of the discs 106. The angled disposition of the wedge surfaces 158 acts to urge the hub contact surfaces 160 toward the spindle motor hub 130 as the discs 106 are axially positioned into contact with the upper and lower surfaces of the spacers 162.

The compliance of the wedge member 150, as a consequence of both its geometry and fabrication material, will ensure that dimensional variations of the stacked components in the disc stack 178 will automatically be compensated for during assembly. For example, where within the tolerance variation the hub 130 is at a minimal diameter and the disc 106 bore is at a maximum diameter, the fingers 154, 156 will be deflected to provide engagement of the contact surfaces 160 and the hub 130. At the other extreme where the hub 130 is at a maximum diameter and the disc 106 bore is at a minimum diameter, the fingers 154, 156 will compressingly yield. In both cases, as well as all other intermediate cases, this combination of deflection and compliance provides a positive engagement of the contact surfaces 160 against the hub 130 and the wedge surface 158 adjacent the chamfers 180 of the discs 106 before the discs 106 are axially pressed into engagement against the medially interposed spacer 162.

Figure 9:
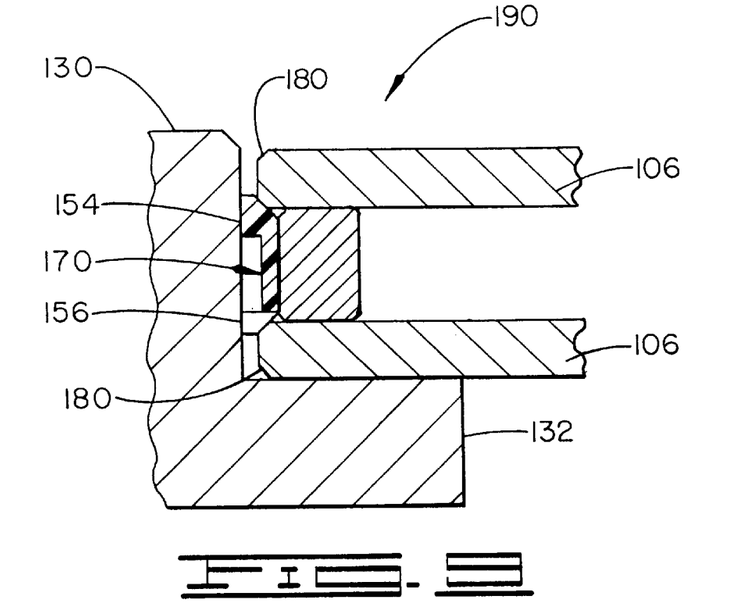
FIG. 9 is a partial, detail closeup sectional elevation view of a portion of the view of FIG. 8.

FIG. 9 is a partial, detail closeup sectional elevation view of a portion of a disc stack 190 assembled with the composite disc spacer 170 of the present invention. A spring disc clamp, such as the disc clamp 182 (FIG. 8) has been omitted in FIG. 9 but it will be understood that such clamp or the equivalent must be used to provide a force load on the disc stack as discussed above. The disc stack 190 of FIG. 9 consists of two discs 106 separated by the composite disc spacer 170. It will be understood that the upwardly-extending fingers 154 of the composite disc spacer 170 engage the chamfer 180 on the bore edge of the disc 106 that is disposed above the composite spacer 200. Again it should be recalled that the preferred embodiment of the invention includes three such upwardly-extending fingers 154 equally spaced about the circumference of the disc 106, thereby positively centering the disc 106 relative to the spindle motor hub 130 as a loading force is applied. Any dimensional variations resulting from manufacturing tolerances in the components of the disc stack 190 will be compensated for due to the geometry of the wedge member 150. As described, the compliant fingers 154, 156 compensate for disc stack component dimensional variations.

FIG. 9 also shows the relative position of the downwardly-extending fingers 156 of the wedge member 150. It will be recalled that in the preferred embodiment of the invention the downwardly-extending fingers 156 are also equally spaced from each other between the upwardly-extending fingers 154 and about the circumference of the wedge member 150. This results in the downwardly-extending fingers 156 acting to positively center the lowermost disc 106 of the disc stack 190.

One skilled in the art will appreciate that, if a mechanical shock is applied to the disc drive 100 in an axis which tends to shift the discs 106 radially relative to the spindle motor hub 130, hard contact between the bore edges of the discs 106 and the fingers 154 and 156 of the wedge member 150, and contact between the fingers 154 and 156 and the spindle motor hub 130 will substantially eliminate any radial shifting of the discs 106.

Figure 10:
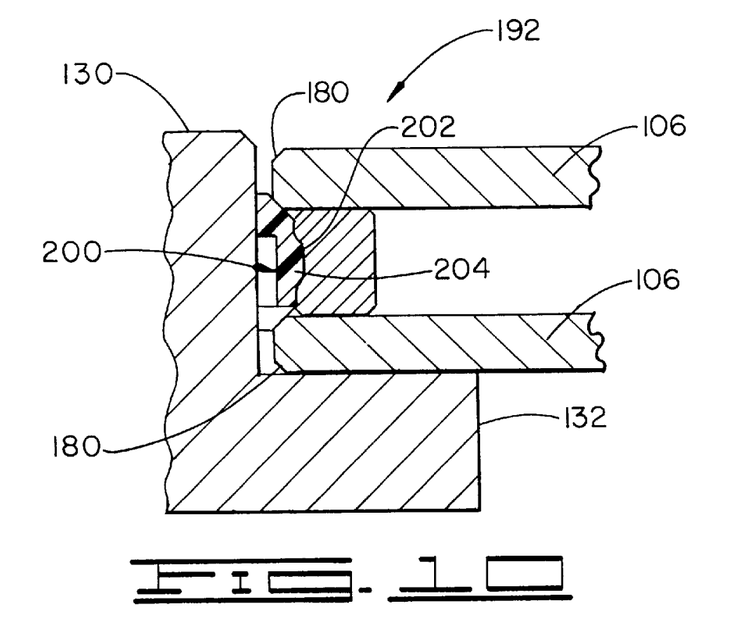
FIG. 10 is a partial, detail closeup sectional elevation view of a presently preferred embodiment of the invention, showing features which connect the wedge member of FIG. 4 to the spacer of FIG. 5.

Turning finally to FIG. 10, shown is a disc stack 192 with two discs 106 in a manner similar to the disc stack 190 of FIG. 9. FIG. 10 also shows the discs 106 separated by a modified composite disc spacer 200. A spring disc clamp, such as the disc clamp 182 (FIG. 8) has been omitted in FIG. 10 but it will be understood that such a clamp or the equivalent must be used to provide a force load on the disc stack as discussed above. The composite disc spacer 200 is identical in construction to that of the composite disc spacer 170 except as now described. For convenience of reference, the same component numbers will be used to describe the composite disc spacer 200 where identical to that of the composite disc spacer 170. The outer surface of the ring portion 152 and the inner surface of the spacer 162 have been modified to include interlocking tongue 202 and groove 204. That is, the outer surface of the ring portion 152 of the wedge member 150 has a convex shape, while the inner surface of the spacer 162 has been formed with a complementary concave shape. The compliant material of the wedge member 150 will readily allow these mating surfaces to be engaged, thus permitting the wedge member 150 and spacer 162 to be assembled together to form the composite disc spacer 200 so as to be handled as a single unit during assembly of the disc stack 192. It will be apparent that other geometries for the interlocking tongue 202 and groove 204 are readily envisioned, and the scope of the present invention is not limited by the specific form of the interlocking tongue 202 and groove 204 between the wedge member 150 and the spacer 162.

The present invention provides a composite disc spacer (170) for a disc drive (100) which has a wedge member (150) and a spacer (162) that together in the assembled mode comprise the composite disc spacer. The wedge member has a plurality (preferably three) upwardly-extending fingers (154) equally spaced about the circumference of the wedge member, and a plurality (again preferably three) of downwardly-extending fingers (156) equally spaced about the circumference of the wedge member between the upward-extending fingers. The fingers (154 and 156) include inwardly-facing hub contact surfaces (160) and outwardly-facing beveled wedge surfaces (158). When the composite disc spacer is positioned in a disc stack, the fingers bear against the chamfers (180) at the inner bore edges of the discs (106) to positively center the discs relative to the spindle motor hub (130). Direct contact between the fingers and the hub and between the fingers and the discs prevents radial shifting of the discs relative to the spindle motor hub when the disc drive is subjected to an applied mechanical shock. The composite disc spacer (200) of the invention can also include an interlocking tongue (202) and groove (204) on the wedge member and the spacer so that the composite disc spacer can be handled as a single unit during disc stack assembly.

From the foregoing, it is apparent that the present invention is particularly well suited and well adapted to achieve the functionality set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A composite disc spacer for facilitating assembly of a disc stack having a number of discs on a spindle motor hub in a disc drive, the composite disc spacer comprising:

a wedge member comprising a ring portion supporting a plurality of upwardly-extending fingers and a plurality of downwardly-extending fingers, the upwardly-extending and downwardly-extending fingers including inward-facing hub contact features for contacting the spindle motor hub and outward-facing wedge surfaces for contacting the discs of the disc stack; and a spacer dimensioned to be disposed about the ring portion of the wedge member, the spacer establishing an average spacing distance between adjacent discs of the disc stack.

2. The composite disc spacer of claim 1 wherein the wedge member is formed of a plastic and the spacer is formed of a metal.

3. The composite disc spacer of claim 2 wherein the plastic is a polycarbonate.

4. The composite disc spacer of claim 2 wherein the metal of the spacer is aluminum.

5. The composite disc spacer of claim 2 wherein the metal of the spacer is stainless steel.

6. The composite disc spacer of claim 1 wherein the wedge member and the spacer interlock so that the wedge member and the spacer can be handled as a single unit during assembly of the disc stack.

7. A composite disc spacer for facilitating assembly of a disc stack having discs supported on a spindle motor hub in a disc drive, the composite spacer comprising:

first means for positively centering the discs relative to the spindle motor hub and providing direct contact between a bore of each discs and the spindle motor hub; and second means for providing fixed axial spacing between adjacent discs in the disc stack.

8. The composite disc spacer of claim 7 further comprising third means for interlocking the first means to the second means so that the first and second means can be handled as a unit during assembly of the disc stack.

9. A disc drive including a disc stack having a plurality of discs mounted on a spindle motor hub, and comprising a composite disc spacer comprising:

a wedge member having a ring portion supporting a plurality of upwardly-extending fingers and a plurality of downwardly-extending fingers, the upwardly-extending and downwardly-extending fingers including inwardly-facing hub contact surfaces for contacting the spindle motor hub and outwardly-facing wedge surfaces for contacting the discs of the disc stack; and a spacer dimensioned to extend about the ring portion of the wedge member to establish an average spacing distance between adjacent discs of the disc stack.

10. The disc drive of claim 9 wherein the wedge member is formed of a plastic and the spacer is formed of a metal.

11. The disc drive of claim 10 wherein the plastic of the wedge member is a polycarbonate.

12. The disc drive of claim 10 wherein the metal of the spacer is aluminum.

13. The disc drive of claim 10 wherein the metal of the spacer is stainless steel.

14. The disc drive of claim 9 wherein the wedge member and the spacer include an interlock so that the wedge member and the spacer can be handled as a single unit during assembly of the disc stack.

15. The disc drive of claim 14 wherein the wedge member and the spacer include an interlocking tongue and groove.

* * * * *

UNITED STATES PATENT AND TRADEMARK OFFICE
CERTIFICATE OF CORRECTION

PATENT NO. : 6,130,801  
DATED : October 10, 2000  
INVENTOR(S) : Chunjer C. Cheng and Keith F. Wood Page 1 of 1

It is certified that error appears in the above-identified patent and that said Letters Patent is hereby corrected as shown below:

Title page,
Item [56], References Cited, replace "5,781,375 Moir et al." with -- 5,781,374 Moir et al. --.

Column 4,
Line 57, replace "flange 32" with -- flange 132 --.

Column 5,
Line 38, replace "5,295.030" with -- 5,295,030 --.

Column 7,
Line 29, replace "flange 132 A" with -- flange 132. A --.

Signed and Sealed this

Seventh Day of May, 2002

Attest:

Attesting Officer

JAMES E. ROGAN
Director of the United States Patent and Trademark Office